US006632093B1

(12) United States Patent
Rice et al.

(10) Patent No.: US 6,632,093 B1
(45) Date of Patent: Oct. 14, 2003

(54) DISPLAY SYSTEM FACILITATING PAINT COLOR SELECTION AND COORDINATION

(75) Inventors: Mary R. Rice, Laguna Niguel, CA (US); James P. Pace, Mira Loma, CA (US)

(73) Assignee: Behr Process Corporation, Santa Ana, CA (US)

( * ) Notice: Subject to any disclaimer, the term of this patent is extended or adjusted under 35 U.S.C. 154(b) by 0 days.

(21) Appl. No.: 09/538,659

(22) Filed: Mar. 30, 2000

(51) Int. Cl.[7] .................................................. G09B 19/00
(52) U.S. Cl. ......................................... 434/98; 434/104
(58) Field of Search ..................... 434/98, 81, 101, 434/102, 104

(56) References Cited

U.S. PATENT DOCUMENTS

| 924,322 A | | 6/1909 | Crosby |
|---|---|---|---|
| 1,125,078 A | | 1/1915 | Dunn |
| 1,351,661 A | | 8/1920 | Kaufman |
| 1,483,529 A | | 2/1924 | Tanner |
| 1,515,512 A | | 11/1924 | Mitchell |
| 1,529,125 A | | 3/1925 | Goodwin |
| 1,564,743 A | * | 12/1925 | Adler |
| 1,593,113 A | | 7/1926 | Winsche |
| 1,630,247 A | * | 5/1927 | Adler |
| 1,762,036 A | | 6/1930 | Steedle |
| 1,764,083 A | | 6/1930 | Miskella |
| 1,824,598 A | | 9/1931 | Holder |
| 2,866,277 A | * | 12/1958 | Wise |
| 2,938,281 A | * | 5/1960 | Miller |
| 2,988,824 A | | 6/1961 | Morton |
| 3,751,829 A | | 8/1973 | Foss |
| 4,104,809 A | | 8/1978 | Day et al. |
| 4,112,594 A | | 9/1978 | Impastato |
| 4,211,016 A | | 7/1980 | Eldar |
| 4,665,394 A | | 5/1987 | Coles et al. |
| 4,796,888 A | | 1/1989 | Louez |
| 4,801,267 A | | 1/1989 | Von Loesch et al. |
| 4,911,642 A | | 3/1990 | Knowles |

(List continued on next page.)

FOREIGN PATENT DOCUMENTS

| CA | 769859 | 10/1967 |
|---|---|---|
| DE | 1 218 321 | 6/1966 |
| FR | 1453237 | 9/1966 |

OTHER PUBLICATIONS

The Principles of Color Technology, $2^{nd}$ Edition, Billmeyer and Saltzman, Max, p. 28.*
Journal of Information Display, vol. 11, No. 6, (6/75). Hendrickson, Herbert C. "Positional Color Coding–A Color Identification System that Combines Color and Intensity." pp. 22–25.

Primary Examiner—Derris H. Banks
Assistant Examiner—Bena B. Miller
(74) Attorney, Agent, or Firm—Knobbe, Martens, Olson & Bear LLP.

(57) ABSTRACT

An architectural paint color display system comprises a plurality of displays each having a two dimensional array of architectural paint color samples showing paint colors from only one of a plurality of non-overlapping contiguous portions of a color space. Each of such color space portions is defined as the space of all colors within a band of hues within the color space. Each of said color space portions is exclusively represented by one of the displays, and each of the displays represents only one of said color space portions, such that there is a one-to-one correspondence between displays and color space portions. The paint color samples have in one dimension of the arrays an increasing value and in the other dimension of the arrays an increasing chroma. The displays are preferably arranged in a three-row or six-row matrix. Each row of the matrix displays color space portions in the same sequence that such portions appear in the color space. Advantageously, each column of displays within the matrix shows color space portions that are generally split-complementary or five-way harmnonious.

46 Claims, 9 Drawing Sheets

U.S. PATENT DOCUMENTS

| | | |
|---|---|---|
| 4,992,050 A | 2/1991 | Edwards |
| 4,998,882 A | 3/1991 | Glover |
| 5,026,286 A | 6/1991 | Hellwig |
| 5,033,963 A | 7/1991 | Bourges |
| 5,123,745 A | 6/1992 | Augur |
| 5,161,974 A * | 11/1992 | Bourges ................ 434/98 |
| 5,174,758 A | 12/1992 | Abramson |
| 5,275,566 A | 1/1994 | Yang |
| 5,311,293 A * | 5/1994 | MacFarlane et al. ........ 356/421 |
| 5,842,866 A | 12/1998 | Chow |
| 5,860,518 A * | 1/1999 | Axelrod ................ 206/224 |

* cited by examiner

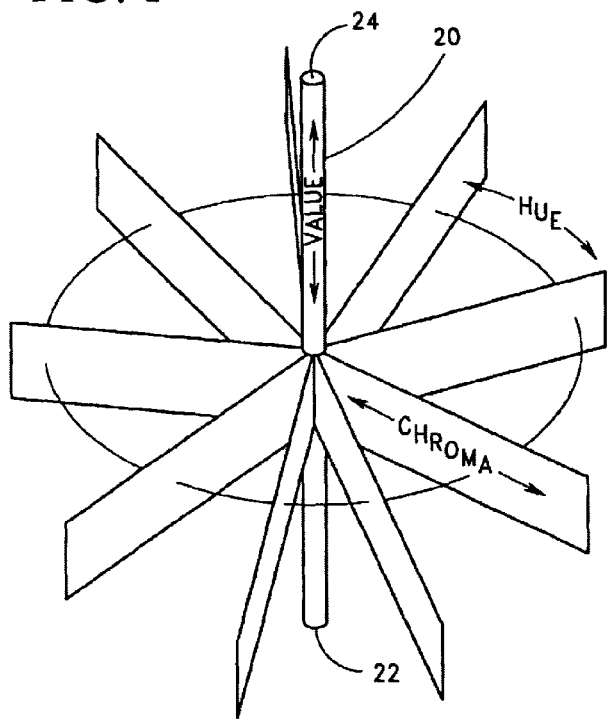
FIG. 1
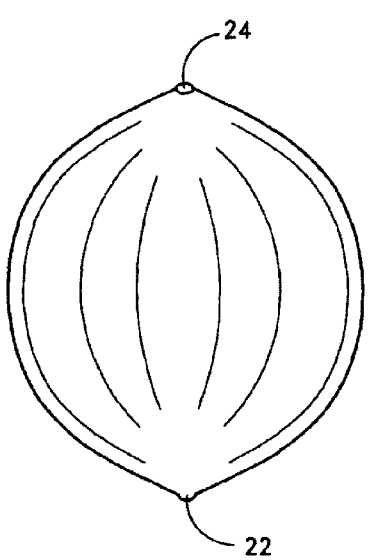
FIG. 2
FIG. 4

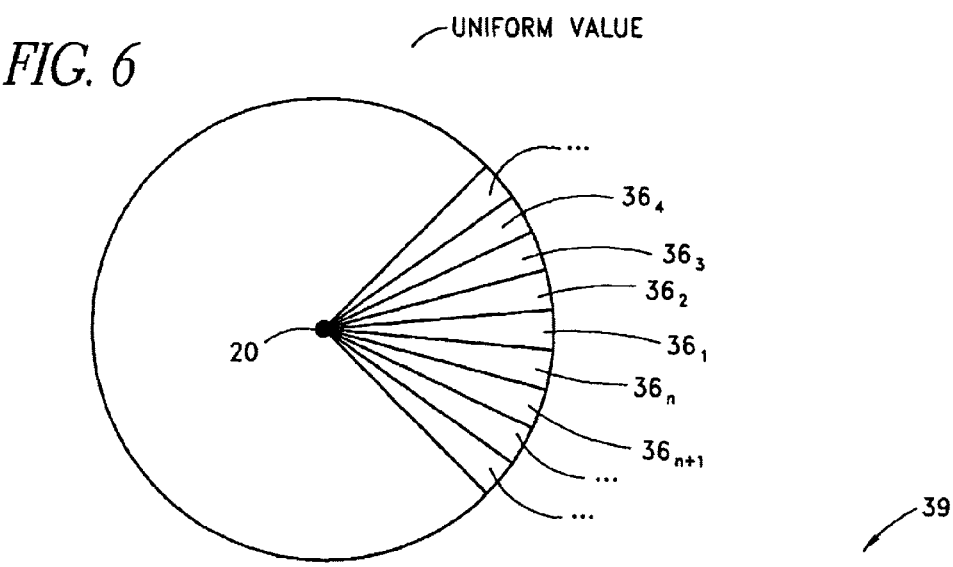
FIG. 6
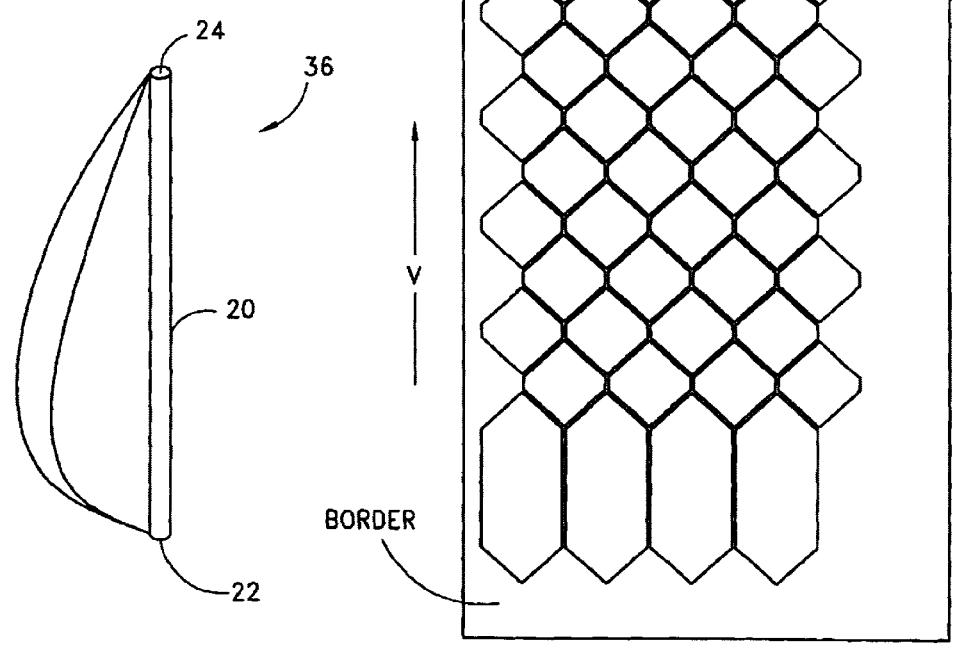
FIG. 7
FIG. 8

DISPLAY SYSTEM FACILITATING PAINT COLOR SELECTION AND COORDINATION

BACKGROUND

1. Field

The present invention relates generally to architectural paint color display systems and, specifically, to an architectural paint color display system facilitating selection of paint colors and selection of complementary paint colors.

2. Description of the Related Art

Architectural paint ("house paint") is commonly provided in various colors. Paint color display systems have been developed to display various paint color samples to assist consumers in selecting paint colors. Such systems typically involve a display board, pamphlet, or book having ink-based or paint color samples.

Paint colors are sometimes referenced with respect to systems for arranging and describing color, generally referred to as color-order systems. One well-known color-order system is the Munsell system. According to the Munsell system, all possible colors are characterized by three attributes: hue, value, and chroma. Hue is the attribute of color which is commonly described by words such as "red," "yellow," "green," "blue," "purple," etc. Value is the attribute of color which is described by the words "light," "dark," etc. Chroma is the attribute of color which is described by the words "bright," "dull," etc. For example, the colors of a tomato and a brick may be equal in hue and value, yet the colors are not identical. The difference is that the tomato is brighter, having a higher chroma.

Munsell color space is a three-dimensional space including and describing visual relationships between colors. This color space is based on a collection of actual physical samples arranged so that adjacent samples represent distinct intervals of visual color perception. Although based on physical samples, Munsell color space is theoretically capable of describing all possible colors. According to the Munsell system, color space is described with respect to three dimensions: hue, value, and chroma. Theoretically, the Munsell location of every possible color can be described by three coordinates, corresponding to the hue, value, and chroma of the given color. Although in theory Munsell color space is capable of describing all colors, it is understood that it may not be possible to create physical samples of all of the colors described by Munsell color space. In particular, not all theoretical colors within the perceived Munsell color space can be made into paints.

Within Munsell color space, a vertical axis, known as the value axis, represents color value. In other words, the value (lightness/darkness) of color is determined by the vertical position within color space. Color becomes lighter as the vertical position increases. The hue of color is determined by the angular position about the vertical value axis. The various hues, i.e., shades of red, yellow, green, blue, purple, etc., are represented by vertical planes extending radially from the value axis. Moreover, every angular position about the axis, from 0° to 360°, represents a different hue. The chroma (brightness/dullness) of color is determined by the radial distance from the value axis. Color is dull (gray) near the axis and becomes brighter, or more "chromatic," as the radial distance from the value axis increases.

The Munsell system is one of a number of color-order systems based on actual physical samples. Another class of color-order systems are not based on physical samples. One of the most important of these systems is the CIE System (Commission International de l'Eclairage or International Commission on Illumination).

In prior art paint color display systems, it is common to group paint color samples so that samples of various hues are adjacently displayed. This display method assists consumers in selecting a paint color from a spectrum of hues.

SUMMARY

The present invention provides an improved architectural paint color display system to assist in both paint color selection and complementary paint color selection. In particular, the present invention recognizes that current methods of displaying paint colors do not provide the consumer with a substantially comprehensive selection of paint colors and do not effectively assist the consumer in selecting complementary paint colors.

The present invention recognizes that, for a selected hue or a narrow band of similar hues, the consumer may desire to select a paint color from a spectrum of generally evenly spaced value and chroma.

In one aspect, the present invention provides an architectural paint color display system to assist customers in the selection of architectural paint colors, comprising a plurality of displays each having a two dimensional array of architectural paint color samples from only one of a plurality of fixed contiguous portions of a color space. Each of the color space portions is defined as the space of all colors within a band of hues within the color space. The paint color samples have in one dimension of the array an increasing value and in the other dimension of the array an increasing chroma. Adjacent paint color samples of the array represent substantially equal intervals of visual color perception. Each of the paint color samples correspond to a paint formula for an architectural paint. Preferably, all of the paint color samples are particularly suited for architectural paint purposes.

In another aspect of the invention, each of said color space portions is represented by only one display, the number of displays being divisible by three or six. The displays are arranged in a three-row or six-row matrix, each row of said matrix displaying hue bands in the same sequence that the hue bands appear in the color space. Each column of the matrix displays hue bands that are generally split-complementary or generally six-way harmonious.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIG. 1 is a graphical illustration of theoretical color space;

FIG. 2 is a perspective view of theoretical color space;

FIG. 4 is a uniform hue plane of theoretical color space;

FIG. 6 is a uniform value cross-section of an architectural paint color space of the present invention, illustrating the division of color into a plurality of fixed non-overlapping color space portions;

FIG. 7 is a perspective view of a single color space portion of the present invention;

FIG. 8 shows one embodiment of a display card of the present invention;

DETAILED DESCRIPTION

The present invention recognizes that it is useful to display architectural paint colors with reference to hue, value, and chroma as contemplated by a theoretical color system. To describe the invention, it will be helpful to provide a context for discussion of color, including a three-dimensional color space model and some principles concerning complementary colors.

An appropriate theoretical three-dimensional color space is graphically illustrated in FIG. 1. A vertical value axis 20 is shown. The value of color, i.e., the lightness or darkness of color, is determined by the vertical position within color space. Color becomes lighter as the vertical position increases. The hue of color, i.e., the quality of color which is described by the words "red," "yellow," etc., is determined by the angular position about value axis 20. The chroma, i.e., brightness, of color is determined by the radial distance from value axis 20. Chroma is equal to 0 at the value axis 20. The color space is described below with respect to each of the individual dimensions value, hue, and chroma.

According to the system, color has a finite value (lightness) range. Thus, as shown in FIG. 1, value axis 20 has a finite length. By definition, the minimum value of color is 0, represented at the bottom point 22 of value axis 20, and the maximum value of color is 100, represented at the top point 24 of value axis 20. Value axis 20 represents varying lightness shades of gray, with the darker grays being nearer to the bottom of the axis and the lighter grays being nearer to the top. The bottom point 22 of value axis 20 has zero lightness and corresponds to pure black, the darkest color. Moreover, only pure black has a value equal to 0. Thus, color space converges at point 22 of value axis 20. The top point 24 of value axis 20 has maximum lightness and corresponds to pure white, the lightest color. Moreover, only pure white has a value equal to 100. Thus, color space converges at point 24 of value axis 20. Due to the convergence of color space at the endpoints 22, 24 of value axis 20, color space has a cocoon-like shape, as shown in FIG. 2.

Figure 3:
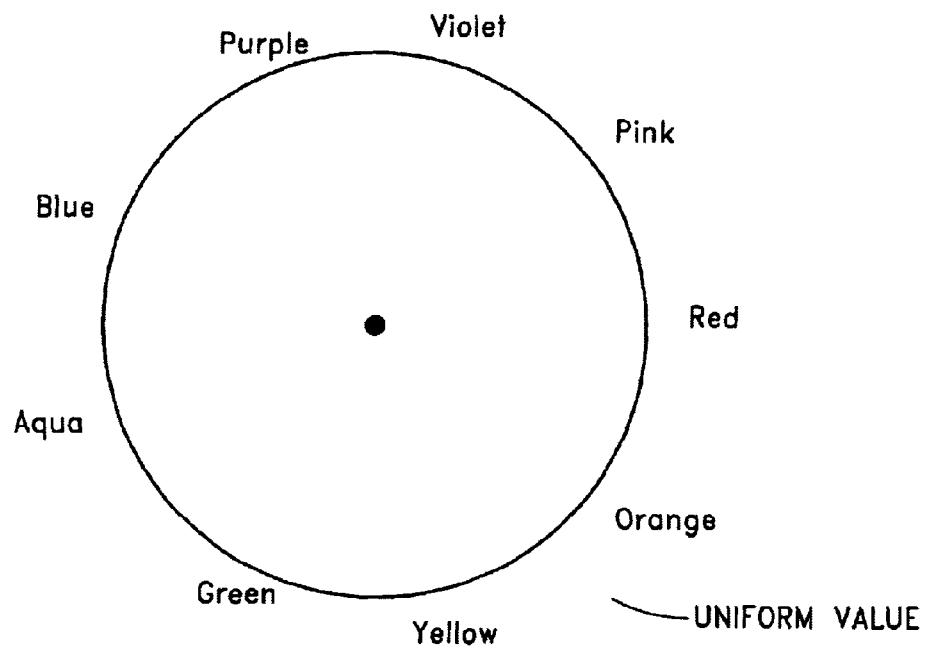
FIG. 3 is a horizontal, i.e., uniform value, cross-sectional view of theoretical color space.

According to the system, color also has a finite hue range. Color hue is limited to the angular positions spanning 0° to 360° about value axis 20. As the angular position about the axis changes, color transitions through a fixed sequence of hues. FIG. 3 shows a horizontal cross-section of color space, intersecting value axis 20 between the endpoints 22 and 24 shown in FIG. 1. In other words, FIG. 3 shows a plane within color space, having a uniform value between 0 and 100. As shown in FIG. 3, in the counter-clockwise direction about the value axis, hue transitions through the following generalized sequence: red, pink, violet, purple, blue, aqua, green, yellow, and orange. Of course, the colors indicated in FIG. 3 will be lighter or darker for different values between 0 (point 22) and 100 (point 24).

In addition to indicating variations in hue, the planar cross-section of theoretical color space represented by FIG. 3 also illustrates chromatic variations in the space. Color becomes brighter as the distance from the value axis 20 increases. Positions far from the value axis are very bright, or chromatic, while positions near the value axis are dull and more grayish. In theory, there is no limit to the possible chroma (brightness) of color having any given hue. However, in practice, color has a limited range of chroma, due to the fact that colors having chroma beyond a certain limit have not been discovered. In particular, for any given value and hue, color has a limited known chroma range. The word "known" is used to indicate that, for a given hue and value, higher chroma are not known to exist. The known chroma range is from 0 at the value axis 20 to an outer radial limit. The outer radial limit of the known chroma range varies for different values and hues. For example, a light yellow has a greater maximum known chroma than does a darker yellow. A dark red has a different maximum known chroma than does a light blue.

FIG. 4 illustrates the varying known chroma range of color in the theoretical color space. FIG. 4 shows a uniform hue plane of the space, i.e., a "slice" of color space corresponding to a single hue. In particular, a vertical plane is shown passing through the value axis 20 and extending radially outward therefrom. This is essentially a known chroma range profile for a given hue. The profile shown in FIG. 4 is typical of most hues within color space. As shown, the uniform hue plane has a straight edge, corresponding to the value axis 20, and a curved edge 28 corresponding to the highest known chroma for any given value. For example, consider a point A on the curved edge 28. Point A has a value $V_A$ and a chroma $C_A$. Thus, at the value $V_A$, the highest known chroma within the displayed hue plane of the space is $C_A$. Within the uniform hue plane, the known chroma range varies with value. At the bottom of the value axis, the known chroma range converges at the point 22. As the value increases, the known chroma range becomes larger. The maximum known chroma range within the displayed hue plane is at the value $V_M$, at which the known chroma ranges from zero at the value axis to $C_M$ on the line 28. The point M corresponds to the brightest color having the hue of the uniform hue plane. As the value increases above $V_M$, the known chroma range decreases. At the top of the value axis, the known chroma range converges at the point 24. It is understood that in practice it may not be possible to create all of the more chromatic colors of a given hue, particularly for architectural paints.

Figure 5:
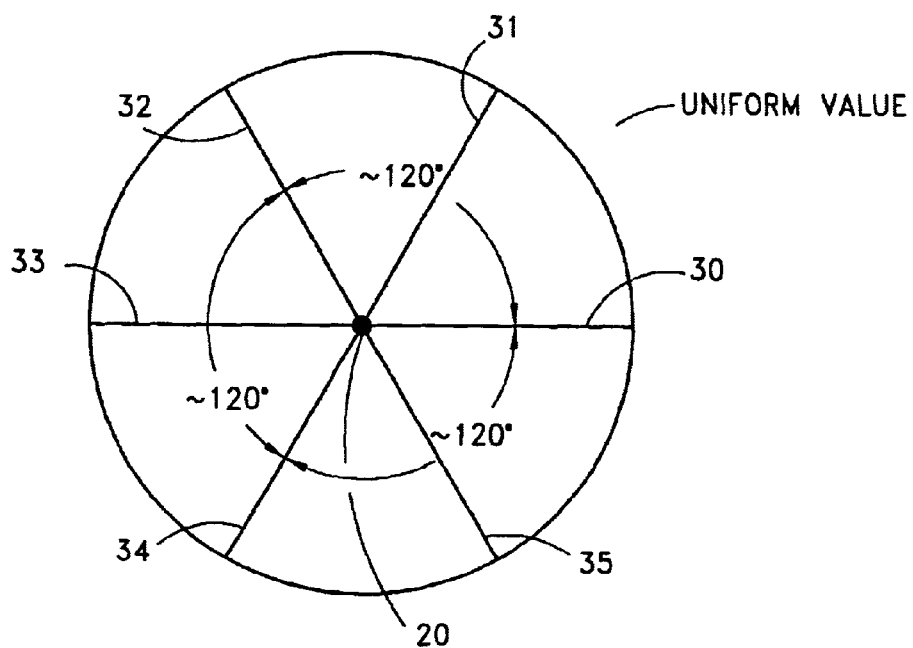
FIG. 5 is a uniform value cross-section of theoretical color space, showing a set of six-way harmonious hues.

For any given reference hue there exists a set of five complementary hues. This is referred to as the "five-way harmony" of the reference hue. FIG. 5 is a uniform value cross-section of the theoretical color space depicting the entire spectrum of hues. FIG. 5 graphically illustrates the five-way harmony of a reference hue represented by the line 30 extending radially outward from the value axis 20. The hues comprising the five-way harmony are those hues that are angularly displaced from the reference hue, line 30, by 60°, 120°, 180°, 240°, and 300° about the value axis 20. In FIG. 5, the hues comprising the five way-harmony of the reference hue, line 30, are represented by lines 31, 32, 33, 34, and 35. More generally, any five of the hues 30, 31, 32, 33, 34, and 35 comprise the five-way harmony of the sixth hue from this set. For convenience, any set of six hues that are angularly displaced in increments of 60° about the value axis 20 will be referred to herein as a "six-way harmony," and will be described as "six-way harmonious." In addition, the hues represented by lines 32 and 34, i.e., the hues that are angularly displaced from the reference hue 30 by 120° and 240° about the value is 20, are known as "split-complements" of the reference hue. The set of lines 30, 32, and 34 graphically represent "split-complementary" hues. Six-way harmonious hues and split-complementary hues are understood to be aesthetically pleasing when displayed together.

The present invention provides an architectural paint color display system comprising a plurality of displays each having a two-dimensional array of architectural paint color samples having a nearly uniform hue. The displays may include color samples comprised of actual paint. However, the samples may comprise other substances, such as ink, colored light, images on television monitors, etc., keeping in mind the goal of displaying a two-dimensional array of various paint colors. In fact, it is common in practice to use paint color displays comprising samples printed using ink.

In accordance with the invention, a massive database of about 65,000 architectural paint color samples has been created, spanning a wide range of all known hue, value, and chroma. These paint color samples form an independent color space which is the basis for the display system of the present invention. These paint color samples have been arranged according to the guiding principle that adjacent samples should represent equal intervals of visual color perception. In a preferred embodiment, these paint color samples are arranged in accordance with the general dimensions of the theoretical color space outlined above. In other words, the samples are arranged with reference to a vertical value axis 20, with chroma varying with the radial distance from the value axis and value varying with the vertical position relative to the value axis. Preferably, this color space spans the entire visible spectrum of hues which are known to exist and are represented within currently known color-order systems. The aforementioned displays of the present invention preferably include a subset of paint color samples from this database, arranged as described below.

The paint color display system of the present invention depicts the color space composed of the aforementioned database of architectural paint colors. As shown in FIG. 6, the color space is divided into a plurality of fixed, non-overlapping, preferably equally-sized, contiguous portions 36. Each of these color space portions 36 is defined as the space of all colors within a band of hues within the color space. In one preferred embodiment, the color space portions 36 collectively span all hues in the color space. The aforementioned displays of the present invention show paint color samples from the color space portions 36, the paint color samples being chosen from the aforementioned database. Each portion 36 is preferably represented by only one display, and each display preferably includes paint color samples from only one portion 36. In other words, there is preferably a one-to-one correspondence between color space portions 36 and displays.

Preferably, the number of color space portions 36 is sufficiently high so that each portion 36 is relatively narrow. Thus, one cannot perceive large differences between colors of different hue within a single portion 36. An advantage of having narrow color space portions 36 is that each portion 36 may represent a nearly uniform hue from which a viewer can select a paint color, as described in grater detail below. Preferably, the hue spans of the color space portions vary, so that each color space portion represents a visually meaningful and generally distinct family of colors. Alternatively, the color space of the invention may be evenly divided so that all of the color space portions have equal hue spans. The color space of the invention is divided into preferably at least 30, more preferably at least 40, more preferably at least 60, more preferably at least 75, and more preferably at least 90 color space portions 36 Although any number of portions 36 can be provided without departing from the spirit and scope of the invention, in a preferred embodiment the color space is divided into 90 color space portions $36_1$–$36_{90}$, shown in FIG. 6. In this embodiment, the mean hue span of the color space portions is about four degrees about the value axis 20, which is sufficiently narrow to provide the above-mentioned benefits. FIG. 7 shows a portion of color space defined by a color space portion 36. As shown, the portion 36 resembles a narrow curved wedge with a straight edge converging at the value axis 20.

In an alternative preferred embodiment, the color space is divided into 91 color space portions 36, but the display system of the present invention includes displays corresponding to only 84 of the 91 color space portions. Seven of the portions 36 are omitted from the display system because they have a high degree of perceptual similarity to adjacent color space portions.

The displays of the present invention each have a two-dimensional array of architectural paint color samples from a particular color space portion 36. Such paint color samples represent a set of positions within the space of the particular portion 36. The paint color samples have in one dimension of the array an increasing value and in the other dimension of the array an increasing chroma. A preferred type of display is a display card. FIG. 8 shows a display 39 comprising a display card 40 according to a preferred embodiment of the invention. The display card 40 has a plurality of adjacent polygonal paint color samples 42 as shown. All of the paint color samples 42 shown on the display card 40 are from a color space portion 36. In the horizontal direction, the samples 42 have an increasing chroma, while in the vertical direction, the samples 42 have an increasing value. In a preferred configuration, the chroma decreases from left to right and the value increases from top to bottom. The paint color samples 42 could have any of a variety of shapes, such as square, rectangular, circular, triangular, etc., keeping in mind the goal of adjacently displaying sample paint colors.

In another aspect of the preferred configuration, the lowermost (lightest) color samples 42 of the display cards 40 are vertically extended to cover a larger area, as shown in FIG. 8. This is because it is easier to detect color differences between very light (high value) color samples if the area of such color samples is relatively large.

Figure 8A:
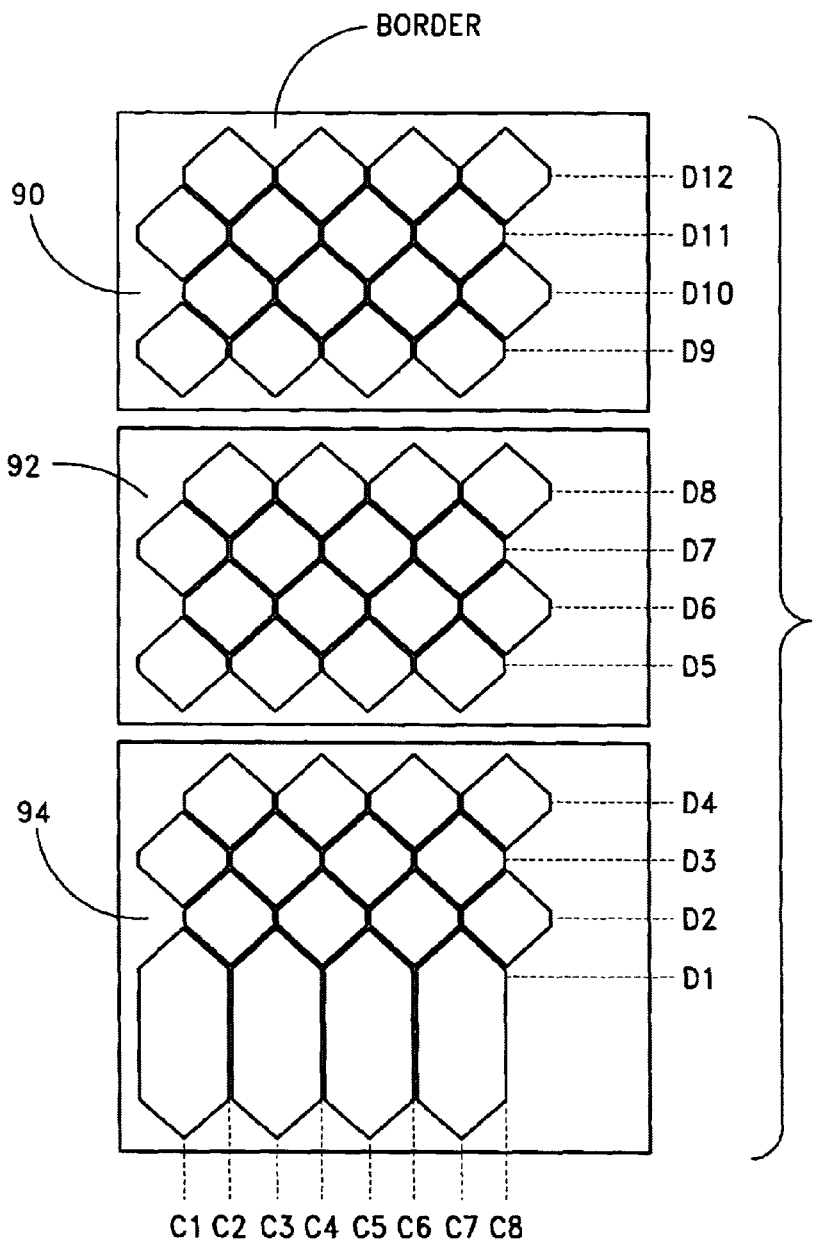
FIG. 8A illustrates the division of the display card of FIG. 8 into a set of smaller display cards.

In yet another aspect, each display card 40 may be replaced by a plurality of smaller display cards which are assembled adjacently so that the viewer can select from a smaller subset of paint color samples. Preferably, each card 40 is replaced with several display cards, each corresponding to a different value range. For example, FIG. 8A shows a set of three smaller display cards 90, 92, and 94 provided in place of the display card 40 of FIG. 8. Advantageously, each card 90, 92, and 94 includes color samples from different value ranges. For example, card 90 can display relatively low value color samples, card 92 can display medium value color samples, and card 94 can display relatively high value color samples. The dotted lines and labels (C1, C2, etc.) therefor are provided to identify the positions of the color samples on the display cards, as will be discussed below.

The paint color samples shown in the displays 39 are preferably arranged so that adjacent samples represent substantially equal intervals of visual color perception. In other words, the paint color samples are preferably arranged so that they appear to the human eye to occupy a generally linear progression of value and chroma in the respective dimensions of the two-dimensional arrays shown in the displays 39. This "perceptually evenly color spaced" arrangement is greatly useful for paint consumers when selecting a paint color, because it evenly represents color within a particular narrow range of hue.

In general, paint is formed by a mixture of a base and one or more colorants. The paint color can be changed by varying the types and amounts of colorants. It is understood that the above-described "perceptually evenly color spaced" arrangement of the paint color samples shown in the displays 39 may require a non-linear distribution of paint components. In other words a perceptually evenly color spaced row or column of paint color samples may not have a linearly changing paint composition. For example, the first, second, and third samples of a row may include one, two, and three drops, respectively, of a particular colorant, while the fourth, fifth, and sixth samples may include 5, 7, and 10 drops of the same colorant. The concentration of the particular colorant may change non-linearly within any dimension of the two-dimensional array, which represents changing value and chroma of the paint color samples. In fact, in some cases, if the concentration of colorants is linearly varied within a display 39, the paint color samples will not be perceptually linear. Some adjacent samples may be perceptually indistinctive, while other adjacent samples may be too different in color to provide a useful range of samples for selecting a paint color.

The displays 39 include paint color samples 42 spanning some or all of the space within a single color space portion 36. In a preferred embodiment, the paint color samples 42 of the display cards 40 preferably span only that portion of space within the single portion 36 that represents useful and desirable architectural paint colors. In other words, the display cards 40 may exclude certain portions of color space for which paint colors are not used or desired by consumers. For example, architectural paint colors having very low chroma (dull) or very high (light) or very low (dark) value are generally unused and, thus, are preferably excluded from the display cards 40. Furthermore, the display cards 40 may span different ranges of value and chroma. In other words, the value and chroma ranges of useful architectural paint colors may differ for different hues. For example, for a generally yellow hue the value range of useful architectural paint colors may be within the upper half of color space, as darker yellows are less useful. On the other hand, for a generally red hue the value range of useful architectural paint colors may be larger, as both dark and light reds are useful. Similarly, chroma ranges of useful paint colors also differ for different hues. Thus, since the display cards 40 may span different ranges of value and chroma, similar grid locations of any two display cards 40 representing different color space portions 36 may have very different values and chroma.

Figure 9:
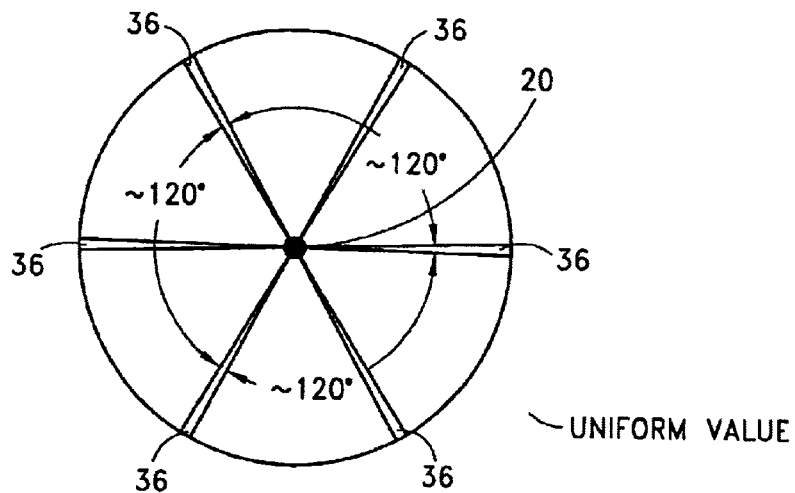
FIG. 9 is a uniform value cross-section of the architectural paint color space of the present invention, showing a set of generally six-way harmonious color space portions.

As mentioned above, six-way harmonious hues and split-complementary hues are understood to be aesthetically pleasing when displayed together. Hues that are nearly six-way harmonious, i.e., angularly separated by approximately 60°, 120°, 180°, 240°, or 300° about the value axis 20, provide nearly the same advantage. Similarly, hues that are nearly split-complementary, i.e., separated by approximately 120° or 240° about the value axis 20, provide nearly the same advantage. According to the invention, it is contemplated that relatively narrow color space portions 36 may be "generally six-way harmonious" or "generally split-complementary," i.e., approximately spaced apart by multiples of 60° or 120° about the value axis 20. FIG. 9 shows a set of generally six-way harmonious color space portions 36. Colors may be selected from any two or more of such portions 36, as discussed in further detail below, resulting in a set of colors which are at least nearly complementary, as described above.

Figure 10:
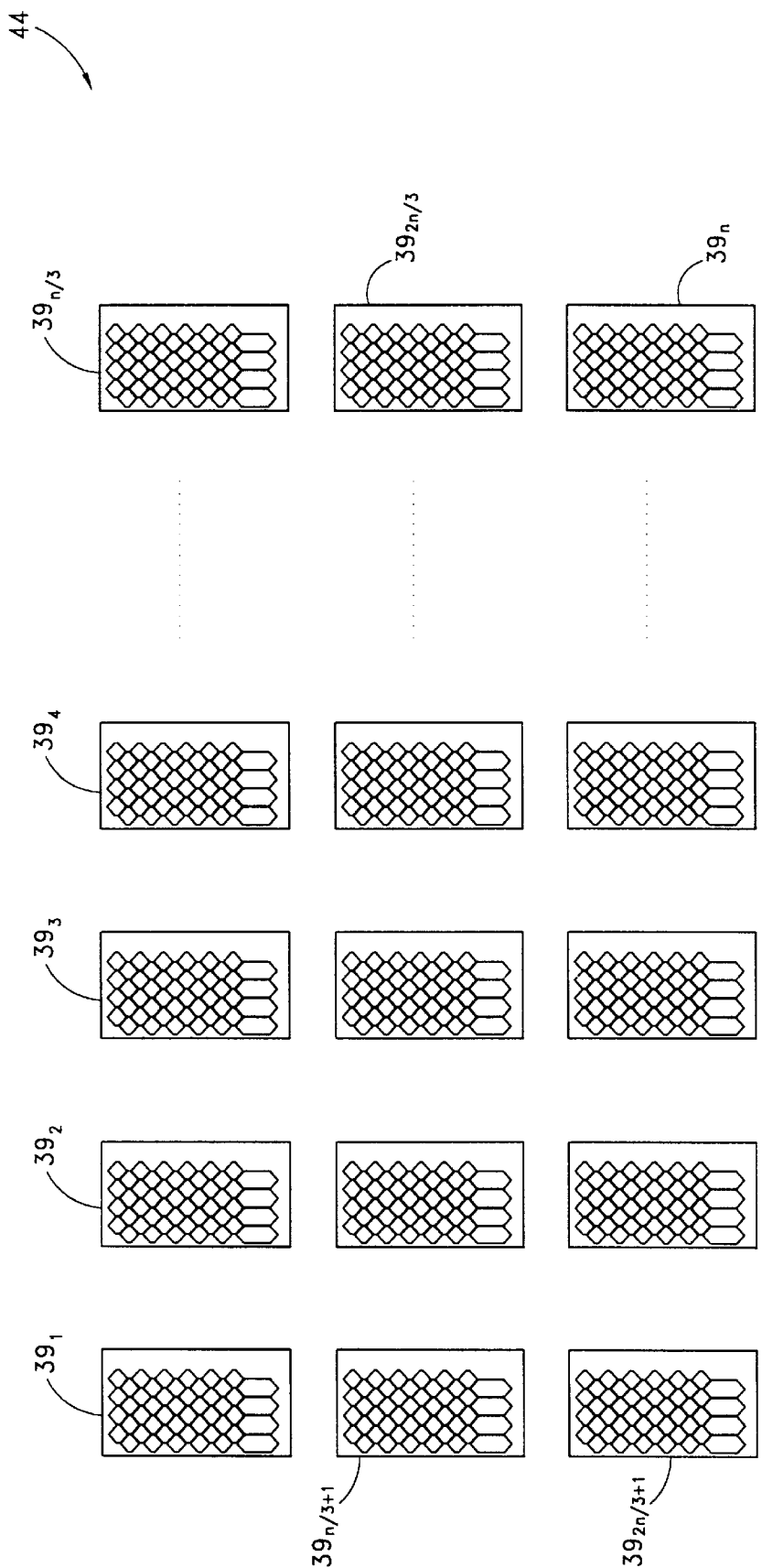
FIG. 10 is a schematic illustration of a preferred embodiment of the display system of the present invention.

FIGS. 10 and 6 describe an architectural paint color display system of the present invention, comprising a plurality of displays 39 arranged in a three-row matrix 44. FIG. 10 schematically shows a preferred arrangement of the displays 39, and FIG. 6 graphically shows the color space portions 36 represented by the displays 39 in the matrix 44. Preferably, the total number of portions 36 is divisible by three so that each of the three rows in the matrix 44 has an equal number of displays 39. Each row in the matrix 44 is preferably arranged so that the portions 36 embodied within the displays 39 are represented in the same sequence in which they appear in the color space of the present invention. This arrangement is illustrated by FIG. 6. As shown, the color space is divided into a plurality of contiguous color space portions $36_1$–$36_n$, where n is the total number of both color space portions and display cards. The matrix 44 includes displays $39_1$ 14 $39_n$, where display $39_1$ corresponds to color space portion $36_1$, display $39_2$ corresponds to color space portion $36_2$, etc. Thus, each row of matrix 44 represents the color space portions 36 in the same order in which they appear in the color space. As mentioned above, some color space portions may not be represented in the display system, to avoid displaying colors which are difficult to perceptually distinguish from one another. These portions are omitted from matrix 44. In this case, each row of matrix 44 represents the color space portions in the same order in which they appear in the color space, with the exception that the omitted color space portions are skipped.

As shown in FIG. 10, the first row of matrix 44 includes display cards $39_1$–$39_{n/3}$, the second row includes display cards $39_{n/3+1}$–$39_{2n/3}$, and the third row includes display cards $39_{2n/+1}$–$39_n$. In a preferred embodiment, n is equal to 90, so that the first through third rows include display cards $39_1$–$39_{30}$, $39_{31}$–$39_{60}$, and $39_{61}$–$39_{90}$, respectively. Although FIG. 6 shows the sequence of portions 36 displayed in the rows of the matrix 44 to be determined by a counter-clockwise progression about the value axis 20, the sequence could alternatively be determined by a clockwise progression thereabout.

Figure 11:
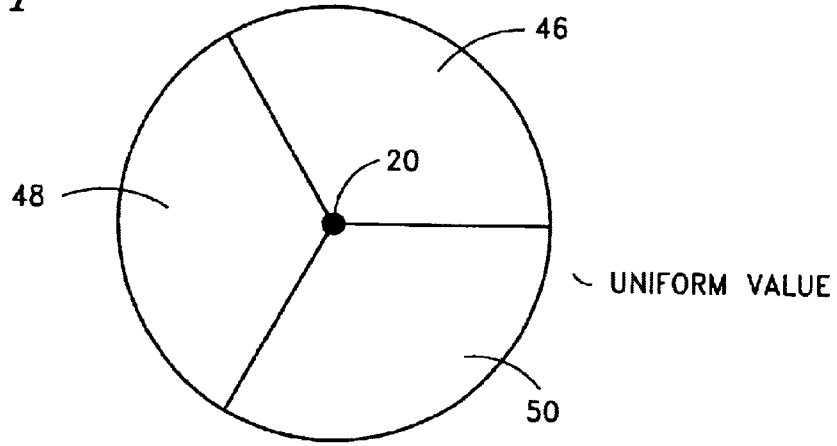
FIG. 11 is a uniform value cross-section of the architectural paint color space of the present invention, showing the span of hues displayed within each row of the matrix of the display system of FIG. 10.

FIG. 11 is a uniform value cross-section of color space showing an exemplary range of hues spanned by the three rows of matrix 44. The first row spans a range of hues 46, the second row spans a range of hues 48, and the third row spans a range of hues 50. As shown, the three rows collectively span all hues in the color space. Each row represents a band of hues spanning approximately 120° about the value axis 20. In other words, the hue ranges 46, 48, and 50 each span approximately 120° about the value axis 20. In a preferred embodiment, each row spans 30 color space portions 36. Accordingly, the first row of matrix 44 includes, in order, displays $39_1, 39_2, \ldots 39_{30}$, corresponding to color space portions $36_1, 36_2, \ldots 36_{30}$. The second row of matrix 44 includes, in order, displays $39_{31}, 39_{32}, \ldots 39_{60}$, corresponding to color space portions $36_{31}, 36_{32}, \ldots 36_{60}$. The third row of matrix 44 includes, in order, displays $39_{61}, 39_{61}, \ldots 39_{90}$, corresponding to color space portions $36_{61}, 36_{62}, \ldots 36_{90}$.

Figure 12:
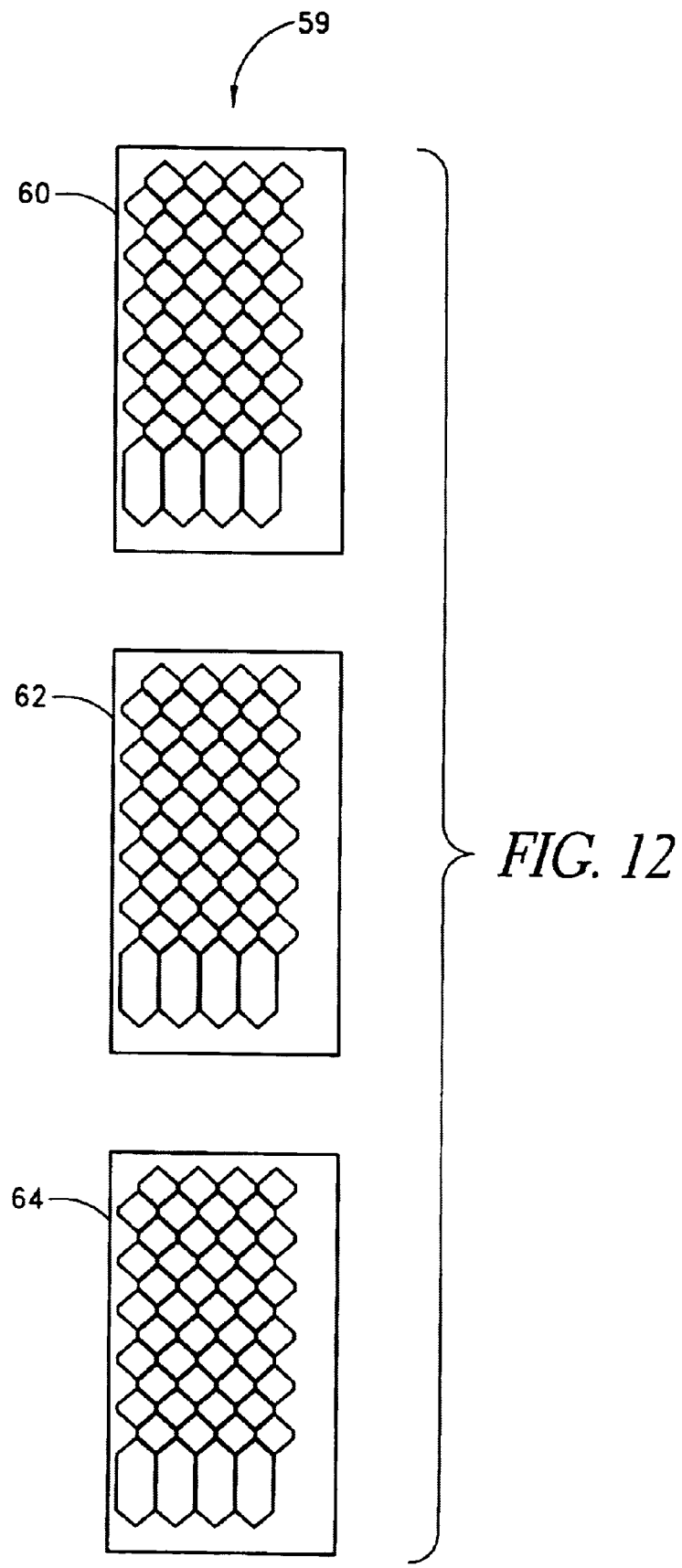
FIG. 12 is a schematic view of a column of the matrix of the display system of FIG. 10.

In a preferred embodiment, the displays 39 are arranged so that each column within the matrix 44 displays color space portions 36 that are generally split-complementary, in the manner shown in FIG. 9. Advantageously, a person viewing the display system 44 can conveniently select architectural paint colors having hues that are at least nearly, if not exactly, split-complementary, simply by selecting paint color(s) from within a first of the displays 39 and then selecting complementary paint colors from within displays in the same column as the first display. To illustrate, FIG. 12 shows a column 59 of displays appearing within the matrix 44 of the present invention. An upper display 60 includes paint color samples from a first narrow color space portion in color space. A middle display 62 includes paint color samples from a second narrow color space portion in color space, the second color space portion being angularly separated from the first color space portion by approximately 120° about the value axis 20. A bottom display 64 includes paint color samples from a third narrow color space portion in color space, the third color space portion being angularly separated from each of the first and second color space portions by approximately 120° about the value axis 20. A person viewing the display system can choose paint colors that are at least nearly split-complementary simply by choosing some paint colors from within each of the displays 60, 62, and 64.

In addition to illustrating the split-complements of all of the color space portions 36 shown in the displays 39, the display system 44 may also provide an indication of the color space portions that comprise the five-way harmony of any given reference hue band. In one embodiment, the displays 39 are numbered 1–n, and each provides an indication of other displays that are of complementary hues. For example, suppose there are 90 color space portions 36 and a viewer selects a paint color from display $39_1$, which represents color space portion $36_1$ (FIGS. 6 and 10). The general five-way harmony of portion $36_1$ is comprised of portions $36_{16}, 36_{31}, 36_{46}, 36_{61}$, and $36_{76}$. These are represented by the displays $39_{16}, 39_{31}, 39_{46}, 39_{61}$, and $39_{16}$, respectively. Display $39_1$ can include a reference to these displays, so that the viewer can conveniently choose paint colors from within the five-way harmony of portion 36.

Figure 13:
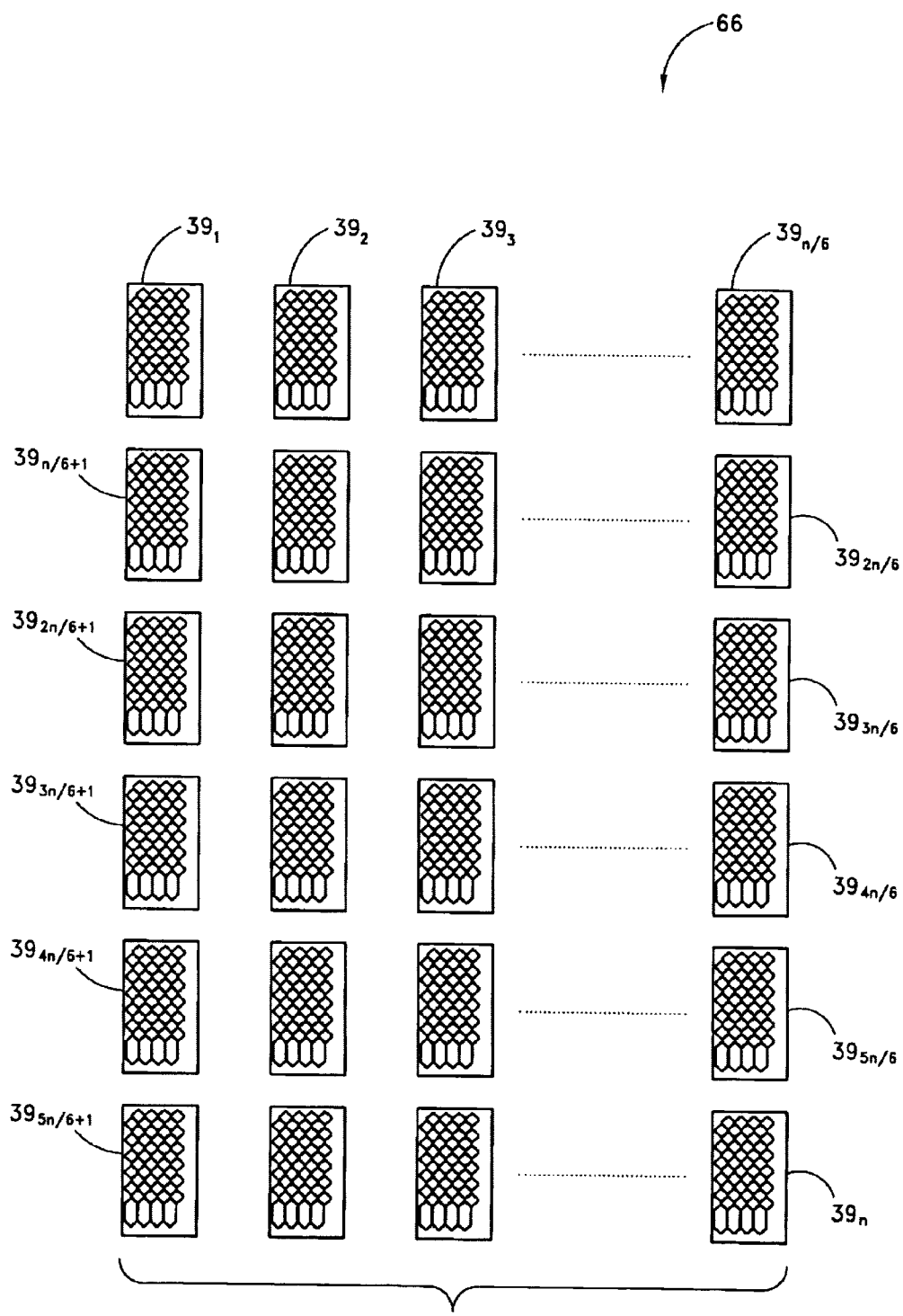
FIG. 13 is a schematic illustration of another preferred embodiment of the display system of the present invention.

FIG. 13 shows an alternative embodiment of the architectural paint color display system of the present invention, comprising a plurality of displays 39 arranged in a six-row matrix 66. In accordance with this embodiment, the number of color space portions 36 is preferably divisible by six so that that each of the six rows in the matrix 66 has an equal number of displays 39. Each row in the matrix 66 is preferably arranged so that the color space portions 36 embodied within the displays 39 are represented in the same sequence in which they appear in the color space of the present invention, with the exception that any omitted color space portions are skipped. As shown in FIG. 13, the first row of matrix 66 includes display cards $39_1-39_{n/6}$, the second row includes display cards $39_{n/6+1}-39_{2n/6}$, the third row includes display cards $39_{2n/6+1}-39_{3n/6}$, the fourth row includes display cards $39_{n/6+1}-39_{4n/6}$, the fifth row includes display cards $39_{4n/6+1}-39_{5n/6}$, the sixth row includes display cards $39_{5n/6+1}-39_n$. In a preferred embodiment, n is equal to 90, so that the first through sixth rows include display cards $39_1-39_{15}, 39_{16}-39_{30}, 39_{31}-39_{45}, 39_{46}-39_{60}, 39_{61}-39_{75}$, and $39_{76}-39_{90}$, respectively.

Figure 14:
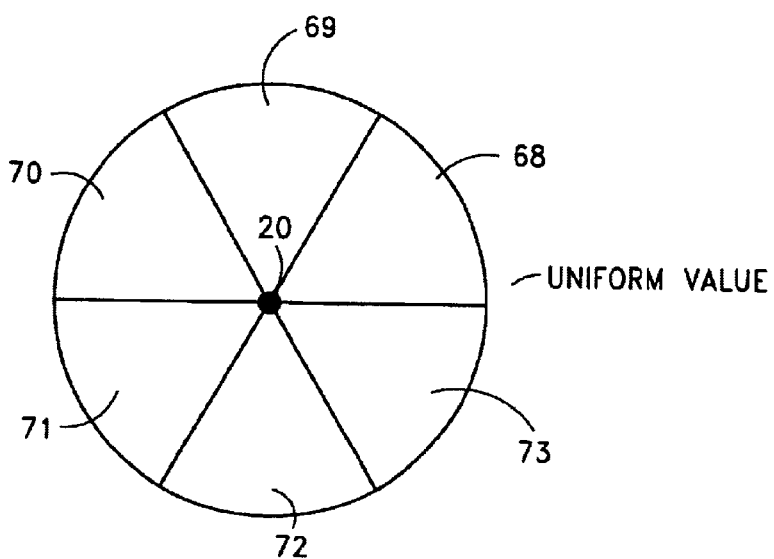
FIG. 14 is a uniform value cross-section of the architectural paint color space of the present invention, showing the span of hues displayed within each row of the matrix of the display system of FIG. 13.

FIG. 14 is a uniform value cross-section of color space showing an exemplary range of hues spanned by the six rows of matrix 66. The first, second, third, fourth, fifth, and sixth rows of matrix 66 span contiguous ranges of hues 68, 69, 70, 71, 72, and 73, respectively. As shown, the six rows collectively span all hues in color space. Each row represents a contiguous band of hues spanning approximately 60° about the value axis 20. In other words, the hue ranges 68, 69, 70, 71, 72, and 73 each span approximately 60° about the value axis 20. In the preferred embodiment, in which color space is divided into 90 color space portions 36, each row spans 15 portions 36. Accordingly, the first row of matrix 66 includes, in order, displays $39_1, 39_2, \ldots 39_{15}$, corresponding to color space portions $36_1, 36_2, \ldots 36_{15}$. The second row of matrix 66 includes, in order, displays $39_{46}, 39_{17}, \ldots 39_{30}$, corresponding to color space portions $36_{17}, 36_{18}, \ldots 36_{30}$. The third row of matrix 66 includes, in order, displays $39_{31}, 39_{32}, \ldots 39_{45}$, corresponding to color space portions $36_{31}, 36_{32}, \ldots 36_{45}$. The fourth row of matrix 66 includes, in order, displays $39_{16}, 39_{47}, \ldots 39_{60}$, corresponding to color space portions $36_{47}, 36_{48}, \ldots 36_{60}$. The fifth row of matrix 66 includes, in order, displays $39_{61}, 39_{22}, \ldots 39_{75}$, corresponding to color space portions $36_{61}, 36_{62}, \ldots 36_{75}$. Finally, the sixth row of matrix 66 includes, in order, displays $39_{76}, 39_{77}, \ldots 39_{90}$, corresponding to color space portions $36_{77}, 36_{78}, \ldots 36_{90}$.

Figure 15:
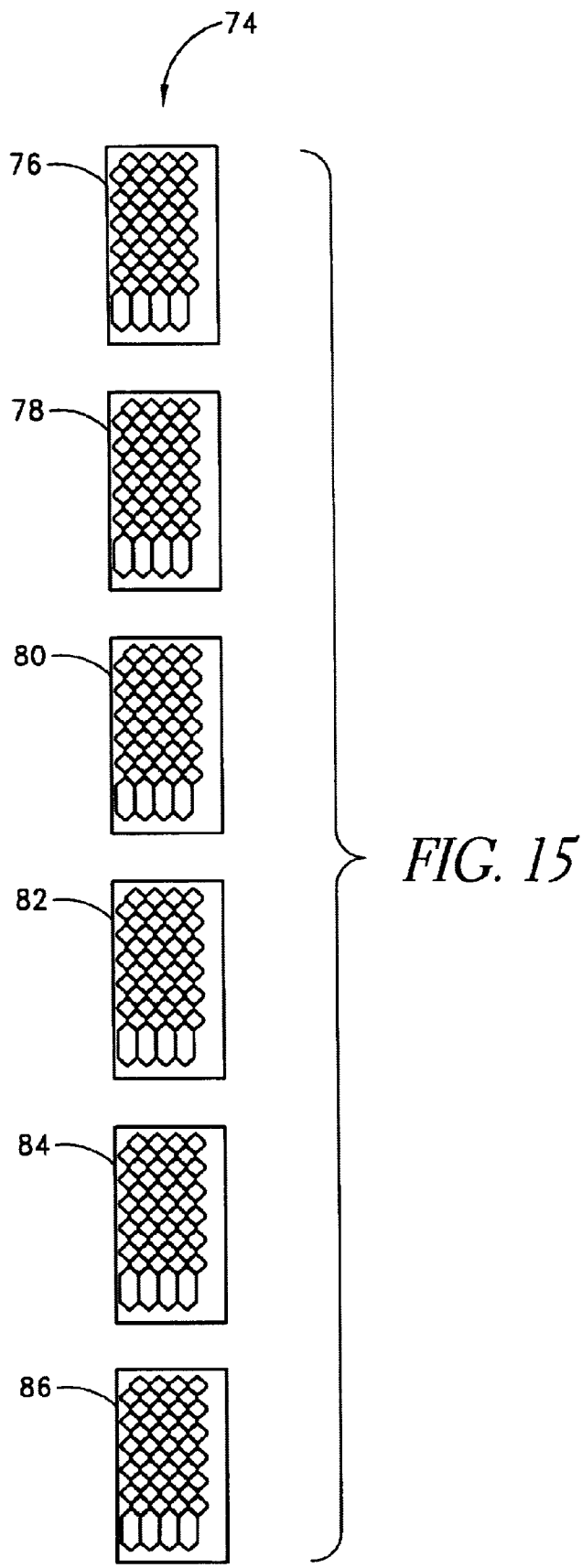
FIG. 15 is a schematic view of a column of the matrix of the display system of FIG. 13.

Also, in this embodiment, the displays 39 are preferably arranged so that each column within the matrix 66 displays color space portions 36 that are generally six-way harmonious, in the manner shown in FIG. 9. Advantageously, a person viewing the display system 66 can conveniently select architectural paint colors having hues that are at least nearly, if not exactly, six-way harmonious, simply by selecting paint color(s) from within one display and then selecting complementary paint colors from within displays in the same column as the first display. To illustrate, FIG. 15 shows a column 74 of displays 76, 78, 80, 82, 84, and 86 appearing within the matrix 66 of the present invention. These displays include paint color samples from narrow color space portions angularly spaced apart by about 60° about the value axis 20, in the manner shown in FIG. 9. A person viewing the display system can choose nearly six-way harmonious paint colors simply by choosing some paint colors from within each of the displays 76, 78, 80, 82, 84, and 86.

In another embodiment of the invention, a display system is provided in which the displays 39 are arranged in any particular manner, and in which the displays are numbered 1–n. Each display 39 includes the display numbers of other displays within the display system that are generally split-complementary or generally five-way harmonious with the hue range that it represents. Upon selecting a first display 39, a user can determine generally complementary displays simply by reading the numbers listed on the first display 39 that identify such generally complementary displays.

Although described with respect to architectural paint colors, those skilled in the art will appreciate that the color display system of the present invention is applicable in other fields, such as in displays of colors for fabrics, cosmetics, interior design, graphic design, visual arts, software development, etc.

As mentioned above, in one preferred embodiment, the color space is divided into 91 color space portions, but only 84 are displayed. Each color space portion includes one "high-chroma color" that is substantially the most chromatic color therein. The complete set of high-chroma colors generally identifies how the color space has been particularly divided into a set of distinct color space portions. Table 1, below, identifies a complete set of 91 high-chroma colors for a division of the color space into 91 distinct color space portions ("CSPs"), according to the above-mentioned preferred embodiment of the invention. In particular, the high-chroma colors are identified by D65 CIELab coordinates (L, a, b) and also by Lch (L, c, h) coordinates, as known in the art. The color information for those high-chroma colors within the seven non-displayed color space portions is italicized.

TABLE 1

High Chroma Color for Each Color Space Portion (CSP)

| CSP | L | a | b | c | h |
|---|---|---|---|---|---|
| 1 | 86.054 | −4.396 | 84.807 | 84.920 | 92.967 |
| 2 | 81.947 | −9.799 | 78.475 | 79.084 | 97.117 |
| 3 | 79.065 | −18.438 | 74.278 | 76.533 | 103.940 |
| 4 | 75.986 | −27.793 | 68.528 | 73.950 | 112.076 |
| 5 | 73.891 | −32.697 | 64.524 | 72.335 | 116.873 |
| 6 | 71.705 | −35.644 | 61.676 | 71.235 | 120.025 |
| 7 | 67.049 | −43.533 | 54.368 | 69.649 | 128.685 |
| 8 | 65.407 | −45.240 | 51.483 | 68.536 | 131.307 |
| 9 | 64.057 | −46.633 | 48.156 | 67.035 | 134.080 |
| 10 | 62.030 | −48.333 | 44.602 | 65.769 | 137.299 |
| 11 | 60.439 | −49.898 | 41.262 | 64.748 | 140.411 |
| 12 | 59.248 | −50.507 | 37.121 | 62.681 | 143.685 |
| 13 | 57.691 | −50.791 | 30.603 | 59.299 | 148.930 |
| 14 | 58.241 | −50.335 | 23.836 | 55.694 | 154.660 |
| 15 | 56.924 | −49.450 | 19.510 | 53.159 | 158.469 |
| 16 | 57.461 | −48.047 | 14.182 | 50.097 | 163.555 |
| 17 | 55.569 | −45.485 | 7.688 | 46.131 | 170.407 |
| 18 | *57.580* | *−45.338* | *6.170* | *45.756* | *172.250* |
| 19 | 56.795 | −44.726 | 4.459 | 44.948 | 174.306 |
| 20 | 55.238 | −43.486 | 0.840 | 43.494 | 178.893 |
| 21 | 56.676 | −40.998 | −6.136 | 41.455 | 188.512 |
| 22 | 54.613 | −39.564 | −9.046 | 40.585 | 192.879 |
| 23 | 62.586 | −36.794 | −15.187 | 39.805 | 202.428 |
| 24 | 61.489 | −34.467 | −20.109 | 39.904 | 210.261 |
| 25 | 61.099 | −30.921 | −25.878 | 40.321 | 219.926 |
| 26 | 60.356 | −28.029 | −30.395 | 41.346 | 227.318 |
| 27 | *60.182* | *−25.986* | *−33.232* | *42.186* | *231.976* |
| 28 | 60.676 | −23.517 | −36.587 | 43.493 | 237.269 |
| 29 | 60.406 | −22.653 | −36.876 | 43.278 | 238.438 |
| 30 | 59.806 | −21.626 | −37.276 | 43.095 | 239.880 |
| 31 | 59.372 | −20.903 | −37.610 | 43.028 | 240.936 |
| 32 | 59.017 | −19.480 | −38.020 | 42.720 | 242.872 |
| 33 | 58.386 | −15.985 | −39.048 | 42.193 | 247.738 |
| 34 | 48.826 | −9.602 | −40.920 | 42.032 | 256.794 |
| 35 | 47.485 | −7.371 | −41.735 | 42.381 | 259.984 |
| 36 | 47.219 | −5.449 | −42.456 | 42.805 | 262.686 |
| 37 | 45.720 | −3.127 | −42.715 | 42.830 | 265.813 |
| 38 | 43.564 | 1.180 | −39.786 | 39.804 | 271.699 |
| 39 | 42.996 | 4.214 | −37.900 | 38.133 | 276.345 |
| 40 | 43.621 | 6.256 | −36.360 | 36.894 | 279.763 |
| 41 | 42.681 | 7.274 | −35.411 | 36.150 | 281.608 |
| 42 | 43.164 | 9.235 | −34.614 | 35.825 | 284.939 |
| 43 | 43.262 | 10.620 | −33.786 | 35.415 | 287.449 |
| 44 | *42.555* | *12.339* | *−32.438* | *34.706* | *290.827* |

TABLE 1-continued

High Chroma Color for Each Color Space Portion (CSP)

| CSP | L | a | b | c | h |
|---|---|---|---|---|---|
| 45 | 42.235 | 13.179 | −32.077 | 34.678 | 292.336 |
| 46 | 42.726 | 14.434 | −31.048 | 34.239 | 294.934 |
| 47 | 42.335 | 17.218 | −29.386 | 34.059 | 300.368 |
| 48 | 47.119 | 20.297 | −27.396 | 34.096 | 306.534 |
| 49 | 44.225 | 20.354 | −27.345 | 34.089 | 306.662 |
| 50 | 45.124 | 22.342 | −26.617 | 34.751 | 310.010 |
| 51 | 49.329 | 25.949 | −24.411 | 35.627 | 316.750 |
| 52 | 48.755 | 29.612 | −21.498 | 36.593 | 324.021 |
| 53 | 49.692 | 34.983 | −18.751 | 39.691 | 331.808 |
| 54 | 47.939 | 38.418 | −16.414 | 41.778 | 336.865 |
| 55 | 47.895 | 45.914 | −11.801 | 47.407 | 345.586 |
| 56 | 47.059 | 47.225 | −8.361 | 47.959 | 349.960 |
| 57 | 50.455 | 48.554 | −6.377 | 48.971 | 352.518 |
| 58 | 39.451 | 49.821 | 18.841 | 53.264 | 20.715 |
| 59 | 41.654 | 52.211 | 22.428 | 56.825 | 23.247 |
| 60 | *42.251* | *52.719* | *27.394* | *59.411* | *27.457* |
| 61 | 42.968 | 52.191 | 28.486 | 59.459 | 28.626 |
| 62 | 43.844 | 52.614 | 31.005 | 61.070 | 30.510 |
| 63 | 44.508 | 53.376 | 33.336 | 62.931 | 31.987 |
| 64 | 45.388 | 54.976 | 36.021 | 65.725 | 33.233 |
| 65 | 46.012 | 54.709 | 36.382 | 65.701 | 33.624 |
| 66 | 46.574 | 56.164 | 37.746 | 67.669 | 33.904 |
| 67 | 47.366 | 55.820 | 38.396 | 67.751 | 34.522 |
| 68 | *51.133* | *58.007* | *40.163* | *70.554* | *34.698* |
| 69 | 48.189 | 56.519 | 42.529 | 70.733 | 36.960 |
| 70 | 50.774 | 57.315 | 44.359 | 72.475 | 37.738 |
| 71 | 51.808 | 57.225 | 46.231 | 73.566 | 38.934 |
| 72 | 54.754 | 57.449 | 51.897 | 77.418 | 42.093 |
| 73 | 56.010 | 56.091 | 53.142 | 77.268 | 43.454 |
| 74 | 56.558 | 54.293 | 53.471 | 76.203 | 44.563 |
| 75 | 58.058 | 52.498 | 55.338 | 76.278 | 46.508 |
| 76 | 59.550 | 51.089 | 56.967 | 76.520 | 48.114 |
| 77 | 61.405 | 48.632 | 60.152 | 77.352 | 51.045 |
| 78 | 63.604 | 46.489 | 63.972 | 79.080 | 53.994 |
| 79 | 64.266 | 45.492 | 65.088 | 79.411 | 55.049 |
| 80 | 67.252 | 40.718 | 68.992 | 80.112 | 59.451 |
| 81 | 69.032 | 37.488 | 72.376 | 81.509 | 62.617 |
| 82 | 73.777 | 29.357 | 80.145 | 85.352 | 69.882 |
| 83 | 74.317 | 27.964 | 81.627 | 86.284 | 71.089 |
| 84 | 75.228 | 26.063 | 82.921 | 86.921 | 72.551 |
| 85 | 77.617 | 20.689 | 85.263 | 87.737 | 76.361 |
| 86 | 78.691 | 17.243 | 87.015 | 88.707 | 78.791 |
| 87 | 79.900 | 14.013 | 87.940 | 89.050 | 80.946 |
| 88 | 81.522 | 8.228 | 90.741 | 91.113 | 84.819 |
| 89 | *81.975* | *7.163* | *90.039* | *90.323* | *85.451* |
| 90 | *81.940* | *6.027* | *88.580* | *88.785* | *86.107* |
| 91 | 82.771 | 3.659 | 87.973 | 88.049 | 87.618 |

Table 2 and 3, below, provide two examples of a suitable selection of paint colors for a paint color display card of the invention. These tables each list a selection of pant colors and their corresponding coordinates (C1, D1, etc.) according to the arrangement of color positions shown on the display cards of FIG. 8A. The colors are identified by 65 CIELab coordinates. Each table describes a display having a two-dimensional array of paint color samples according to the teachings of the present invention. In particular, the arrays have an increasing value in one dimension and an increasing chroma in the other dimension. Moreover, all adjacent samples represent substantially equal intervals of visual color perception, as described above.

Also, each display card 39 (FIG. 8) or set of display cards (FIG. 8A) includes a border color surrounding the above-mentioned color samples. The border color is preferably same color as, or similar to, the high chroma color corresponding to the color space portion represented by the display card. Tables 2 and 3 also indicate the D65 CIELab coordinates for the border color of each represented card.

TABLE 2

First Example of Sample Paint Colors on a Display Card as in FIG. 8A

| Position | Position | L | a | b |
|---|---|---|---|---|
| Border | Border | 56.576 | −48.668 | 15.151 |
| C1 | D1 | 95.749 | −7.166 | 1.807 |
| C1 | D11 | 43.196 | −42.056 | 13.155 |
| C1 | D3 | 90.585 | −17.469 | 2.849 |
| C1 | D5 | 84.034 | −27.784 | 5.182 |
| C1 | D7 | 73.922 | −40.652 | 10.098 |
| C1 | D9 | 61.145 | −48.165 | 14.571 |
| C2 | D10 | 52.054 | −37.281 | 10.160 |
| C2 | D12 | 35.518 | −28.277 | 7.976 |
| C2 | D2 | 92.171 | −10.794 | 1.542 |
| C2 | D4 | 86.755 | −18.254 | 2.427 |
| C2 | D6 | 78.867 | −29.947 | 5.492 |
| C2 | D8 | 67.686 | −39.256 | 10.346 |
| C3 | D1 | 94.706 | −6.558 | 1.931 |
| C3 | D11 | 42.292 | −23.375 | 4.500 |
| C3 | D3 | 88.570 | −11.952 | 1.215 |
| C3 | D5 | 82.123 | −20.097 | 2.805 |
| C3 | D7 | 71.652 | −31.148 | 6.967 |
| C3 | D9 | 57.049 | −33.736 | 8.383 |
| C4 | D10 | 51.271 | −24.808 | 4.268 |
| C4 | D12 | 34.956 | −15.711 | 2.195 |
| C4 | D2 | 90.970 | −7.728 | 1.216 |
| C4 | D4 | 84.856 | −12.766 | 1.207 |
| C4 | D6 | 77.345 | −20.179 | 2.717 |
| C4 | D8 | 66.829 | −30.498 | 6.788 |
| C5 | D1 | 94.045 | −4.514 | 1.306 |
| C5 | D11 | 42.301 | −15.153 | 0.829 |
| C5 | D3 | 87.282 | −8.594 | 0.970 |
| C5 | D5 | 80.754 | −14.712 | 1.469 |
| C5 | D7 | 72.367 | −22.851 | 4.401 |
| C5 | D9 | 57.358 | −24.761 | 4.259 |
| C6 | D10 | 51.707 | −16.988 | 0.832 |
| C6 | D12 | 35.695 | −10.496 | −0.340 |
| C6 | D2 | 89.998 | −5.509 | 1.167 |
| C6 | D4 | 83.506 | −8.662 | 0.624 |
| C6 | D6 | 76.980 | −16.982 | 1.927 |
| C6 | D8 | 66.243 | −21.840 | 3.132 |
| C7 | D1 | 93.647 | −2.596 | 1.419 |
| C7 | D11 | 42.885 | −9.746 | −1.499 |
| C7 | D3 | 86.317 | −5.672 | 0.418 |
| C7 | D5 | 79.709 | −9.711 | 0.881 |
| C7 | D7 | 72.597 | −15.354 | 2.533 |
| C7 | D9 | 57.311 | −16.843 | 1.105 |
| C8 | D10 | 52.153 | −10.418 | −1.586 |
| C8 | D12 | 36.436 | −6.580 | −2.179 |
| C8 | D2 | 89.581 | −3.353 | 0.812 |
| C8 | D4 | 82.522 | −5.182 | 0.392 |
| C8 | D6 | 76.869 | −11.096 | 0.721 |
| C8 | D8 | 66.442 | −14.295 | 0.305 |

TABLE 3

Second Example of Sample Paint Colors on a Display Card as in FIG. 8A

| Position | Position | L | a | b |
|---|---|---|---|---|
| Border | Border | 66.584 | −43.148 | 2.994 |
| C1 | D1 | 95.136 | −7.424 | 0.110 |
| C1 | D11 | 33.473 | −31.330 | 7.197 |
| C1 | D3 | 90.924 | −15.407 | −0.856 |
| C1 | D5 | 82.830 | −27.128 | −0.753 |
| C1 | D7 | 66.398 | −43.051 | 3.610 |
| C1 | D9 | 46.500 | −41.962 | 5.264 |
| C2 | D10 | 38.607 | −34.256 | 4.548 |
| C2 | D12 | 30.267 | −20.923 | 3.679 |
| C2 | D2 | 93.675 | −10.791 | −0.024 |
| C2 | D4 | 88.150 | −19.789 | −1.128 |
| C2 | D6 | 75.565 | −36.065 | 1.055 |
| C2 | D8 | 58.542 | −45.571 | 4.899 |
| C3 | D1 | 94.824 | −6.660 | 0.067 |
| C3 | D11 | 29.601 | −14.338 | −0.047 |
| C3 | D3 | 90.667 | −13.307 | −1.020 |
| C3 | D5 | 82.118 | −23.691 | −0.935 |
| C3 | D7 | 64.555 | −35.222 | 1.376 |
| C3 | D9 | 43.850 | −28.705 | 0.827 |
| C4 | D10 | 36.768 | −16.472 | −1.740 |
| C4 | D12 | 29.026 | −10.799 | −1.279 |
| C4 | D2 | 93.105 | −8.140 | −0.203 |
| C4 | D4 | 86.777 | −13.702 | −1.049 |
| C4 | D6 | 72.518 | −25.597 | −0.865 |
| C4 | D8 | 56.538 | −31.050 | 0.389 |
| C5 | D1 | 93.417 | −5.240 | −0.031 |
| C5 | D11 | 30.394 | −9.510 | −2.184 |
| C5 | D3 | 89.199 | −9.527 | −1.183 |
| C5 | D5 | 80.583 | −17.951 | −1.596 |
| C5 | D7 | 62.505 | −25.430 | −1.163 |
| C5 | D9 | 43.862 | −18.699 | −2.203 |
| C6 | D10 | 36.823 | −10.731 | −3.143 |
| C6 | D12 | 27.887 | −6.495 | −2.125 |
| C6 | D2 | 92.564 | −5.956 | −0.201 |
| C6 | D4 | 85.674 | −10.032 | −1.205 |
| C6 | D6 | 71.846 | −19.503 | −1.294 |
| C6 | D8 | 55.865 | −22.195 | −1.808 |
| C7 | D1 | 92.490 | −4.861 | −0.087 |
| C7 | D11 | 31.368 | −6.729 | −3.031 |
| C7 | D3 | 88.796 | −6.741 | −0.663 |
| C7 | D5 | 80.111 | −13.123 | −1.493 |
| C7 | D7 | 62.234 | −17.994 | −2.818 |
| C7 | D9 | 44.176 | −12.402 | −3.521 |
| C8 | D10 | 37.387 | −6.881 | −3.912 |
| C8 | D12 | 30.148 | −6.445 | −2.819 |
| C8 | D2 | 92.122 | −4.362 | −0.111 |
| C8 | D4 | 84.756 | −6.862 | −1.081 |
| C8 | D6 | 70.551 | −12.951 | −1.706 |
| C8 | D8 | 56.322 | −15.063 | −3.212 |

This application hereby incorporates by reference, in its entirety, the commonly owned U.S. patent application Ser. No. 09/538,664, entitled "Paint Color Matching and Coordinating System," filed Mar. 30, 2000, the filing date of the present application.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A paint color display system to assist customers in the selection of paint colors, comprising a plurality of displays each having a two dimensional array of paint color samples, each array of paint color samples selected substantially from only one of a plurality of contiguous hue portions of a full range of known color hues such that each hue in each of said hue portions is closely related to or the same as each other hue in that same hue portion, each of said displays representing one of said hue portions, said paint color samples in each of said arrays having in a first dimension of said array an increasing value and in a second dimension of said array an increasing chroma, wherein adjacent paint color samples in each of said arrays represent substantially equal intervals of visual color perception, the color samples of each of said arrays including more than one hue, wherein each hue within each of said hue portions is not split-complementary or six-way harmonious with respect to each other hue within the same hue portion, each of said color samples being reproducible as a paint appropriate for use in painting interior and/or exterior walls of a building.

2. The system of claim 1, wherein the color samples on each display span less than a total value range and a total chroma range existing for the hue portion represented by that display.

3. The system of claim 1, wherein each of said displays comprises a display card.

4. The system of claim 1, wherein each of said displays comprises a plurality of display cards, each of said display cards representing a different one of said hue portions.

5. The system of claim 4, wherein each of said displays cards represents a different value range.

6. The system of claim 5, wherein the value ranges represented by said display cards are non-overlapping with each other.

7. The system of claim 5, wherein each of said displays comprises three display cards.

8. The system of claim 1, wherein said plurality of hue portions are non-overlapping.

9. The system of claim 8, wherein said plurality of hue portions spans all hue in said full range of known color hues.

10. The system of claim 9, wherein each of said hue portions is represented by only one display, the number of displays being divisible by three to result in a whole number, said displays being arranged in a three-row matrix, each row of said matrix displaying hue portions in the same sequence that said hue portions appear in said full range of known color hues, each column of said matrix displaying hue portions that are generally split-complementary.

11. The system of claim 10, wherein a first display within said matrix provides an indication of other displays within said matrix that represent hue portions that are generally five-way harmonious with respect to the hue portion represented by said first display.

12. The system of claim 10, wherein the number of displays is 90.

13. The system of claim 10, wherein the number of displays is 84.

14. The system of claim 9, wherein each of said hue portions is represented by only one display, the number of displays being divisible by six to result in a whole number, said displays being arranged in a six-row matrix, each row of said matrix displaying hue portions in the same sequence that said hue portions appear in said full range of known color hues, each column of said matrix displaying hue bands that are generally six-way harmonious.

15. The system of claim 14, wherein the number of displays is 90.

16. The system of claim 14, wherein the number of displays is 84.

17. The system of claim 1, wherein each of said hue portions is represented by only one display.

18. The system of claim 1, wherein a first of said displays provides an indication of other displays within said plurality of displays, said other displays representing selected ones of said hue portions that are generally five-way harmonious with respect to the hue portion that is represented by said first display.

19. The system of claim 1, wherein a first of said displays provides an indication of other displays within said plurality of displays, said other displays representing selected ones of said hue portions that are generally split-complementary with respect to the hue portion that is represented by said first display.

20. A method of displaying paint colors, comprising the steps of:
   dividing a full range of known color hues into a plurality of contiguous hue portions, wherein each of said hue portions does not include the direct complement of any hue in that same hue portion; and
   providing a plurality of displays each having a two-dimensional array of paint color samples selected substantially from only one of said hue portions such that each hue in each of said hue portions is closely related to or the same as each other hue in that same hue portion, said paint color samples having in one dimension of said array an increasing value and in the other dimension of said array an increasing chroma, wherein adjacent paint color samples of said array represent substantially equal intervals of visual color perception, each of said arrays displaying color samples of more than one hue.

21. The method of claim 20, wherein dividing a full range of known color hues into a plurality of contiguous hue portions comprises dividing the full range into non-overlapping hue portions.

22. The, method of claim 21, wherein dividing a full range of known color hues into a plurality of contiguous hue portions comprises dividing the full range into hue portions that span all hue in said full range.

23. The method of claim 22, wherein providing a plurality of displays each having a two-dimensional array of paint color samples selected substantially from only one of said hue portions comprises representing each of said hue portions by only one of said displays.

24. The method of claim 23, further comprising the step of arranging said displays in a three-row matrix, each row of said matrix displaying hue portions in the same sequence that said hue portions appear in said full range of known color hues, each column of said matrix displaying hue portions that are generally split-complementary.

25. The method of claim 24, wherein providing a plurality of displays comprises providing 90 displays.

26. The method of claim 24, wherein providing a plurality of displays comprises providing 84 displays.

27. The method of claim 23, further comprising the step of arranging said displays in a six-row matrix, each row of said matrix displaying hue portions in the same sequence that said hue portions appear in said full range of known color hues, each column of said matrix displaying hue portions that are generally six-way harmonious.

28. The method of claim 27, wherein providing a plurality of displays comprises providing 90 displays.

29. The method of claim 27, wherein providing a plurality of displays comprises providing 84 displays.

30. The method of claim 20, further comprising the step of providing an indication on a first of said displays, said indication indicating other displays within said plurality of displays, said other displays representing hue portions that are generally five-way harmonious with respect to the hue portion represented by said first display.

31. The method of claim 20, further comprising the step of providing an indication on a first of said displays, said indication indicating other displays within said plurality of displays, said other displays representing hue portions that, are generally split-complementary with respect to the hue portion represented by said first display.

32. The method of claim 20, wherein dividing said full range of known color hues into a plurality of contiguous hue portions comprises limiting the size of each of said hue portions to not include any hue that is split-complementary or six-way harmonious with any other hue in that same hue portion.

33. The method of claim 20, wherein providing a plurality of displays each having a two-dimensional array of paint color samples comprises providing displays having paint color samples that are reproducible as paints appropriate for painting interior and/or exterior walls of a building.

34. A paint color display system comprising a plurality of display cards each having a two dimensional array of paint color samples, each of said arrays selected substantially from one of a plurality of fixed non-overlapping contiguous hue portions of a full range of known color hues such that each hue in each of said hue portions is closely related to or the same as each other hue in that same hue portion, said paint color samples in each of said arrays having in one dimension of said array an increasing chroma and in the other dimension of said array an increasing value, said display cards exclusively representing hue portions collectively spanning all hue in said full range of known color hues, the number of display cards being divisible by three to result in a whole number, said display cards being arranged in three rows each having an equal number of display cards, said rows being arranged so that said display cards appear in columns each having three of said display cards, each row displaying hue portions in the same sequence that said hue portions appear in said full range of known color hues, each column displaying hue portions that are generally split-complementary to each other.

35. A color display system comprising a plurality of displays each having a two dimensional array of color samples, each of said arrays selected substantially from only one of a plurality of fixed contiguous hue portions of a full range of known color hues such that each hue in each of said hue portions is closely related to or the same as each other hue in that same hue portion, said color samples in each of said arrays having in one dimension of said array an increasing value and in the other dimension of said array an increasing chroma, wherein adjacent color samples of said array represent substantially equal intervals of visual color perception, wherein each hue of each of said hue portions is not a direct complement of any other hue within that same hue portion, the color samples of each of said arrays including more than one hue.

36. A paint color display system to assist customers in the selection of paint colors, comprising a plurality of displays each-having a two dimensional array of paint color samples, each of said arrays selected substantially from only one of a plurality of fixed contiguous hue portions of a full range of known color hues such that each hue in each of said hue portions is closely related to or the same as each other hue in that same hue portion each of said paint color samples being reproducible as a paint appropriate for painting interior and/or exterior walls of a building, said paint color samples in each of said arrays having in a first dimension of said array an increasing value and in a second dimension of said array an increasing chroma, wherein adjacent paint color samples of said array represent substantially equal intervals of visual color perception, each of said arrays including more than one hue.

37. A paint color display system to assist customers in the selection of paint colors, comprising a plurality of displays: each having a two dimensional array of paint color samples, said paint color samples in each of said arrays having in a first dimension of said array an increasing value and in a second dimension of said array an increasing chroma, each array containing paint color samples from only one of a plurality of exclusive, contiguous hue portions of a full range of known color hues, each of said hue portions being no greater than one thirtieth of said full range of known color hues, each of said paint color samples being reproducible as a paint appropriate for painting interior and/or exterior walls of a building, each of the arrays including color samples, of more than one hue, wherein adjacent paint color samples in each of said arrays represent substantially equal intervals of visual color perception.

38. The system of claim 37, wherein each of said hue portions is no greater than one fortieth of said full range of known color hues.

39. The system of claim 37, wherein each of said hue portions is no greater than one sixtieth of said full range of known color hues.

40. The system of claim 37, wherein each of said hue portions is no greater than one seventy-fifth of said full range of known color hues.

41. The system of claim 37, wherein each of said hue portions is no greater than one ninetieth of said full range of known color hues.

42. A method of displaying paint colors, comprising:

providing a plurality of displays each having a two dimensional array of paint color samples that are reproducible as paints;

configuring the paint color samples of each of the arrays to have in a first dimension of the array an increasing value and in a second dimension of the array an increasing chroma;

limiting the paint color samples of each of the arrays to be from only one of a plurality of exclusive, contiguous hue portions of a full range of known color hues, such that each of the hue portions is represented by only one of the arrays;

configuring the paint color samples of each of the arrays such that adjacent paint color samples represent substantially equal intervals of visual color perception;

configuring the paint color samples of each of the arrays to include more than one hue; and limiting each of the hue portions to be no greater than one thirtieth of said full range of known color hues.

43. The method of claim 42, further comprising limiting each of the hue portions to be no greater than one fortieth of said full range of known color hues.

44. The system of claim 42, further comprising limiting each of the hue portions to be no greater than one sixtieth of said full range of known color hues.

45. The system of claim 42, further comprising limiting each of the hue portions to be no greater than one seventy-fifth of said fall range of known color hues.

46. The system of claim 42, further comprising limiting each of the hue portions to be no, greater than one ninetieth of said full range of known color hues.

* * * * *